J. B. NICHOLSON.
MACHINE FOR MANUFACTURING RIBBED PAVING BLOCKS.
APPLICATION FILED JUNE 25, 1914.
1,148,529.
Patented Aug. 3, 1915.
2 SHEETS—SHEET 1.
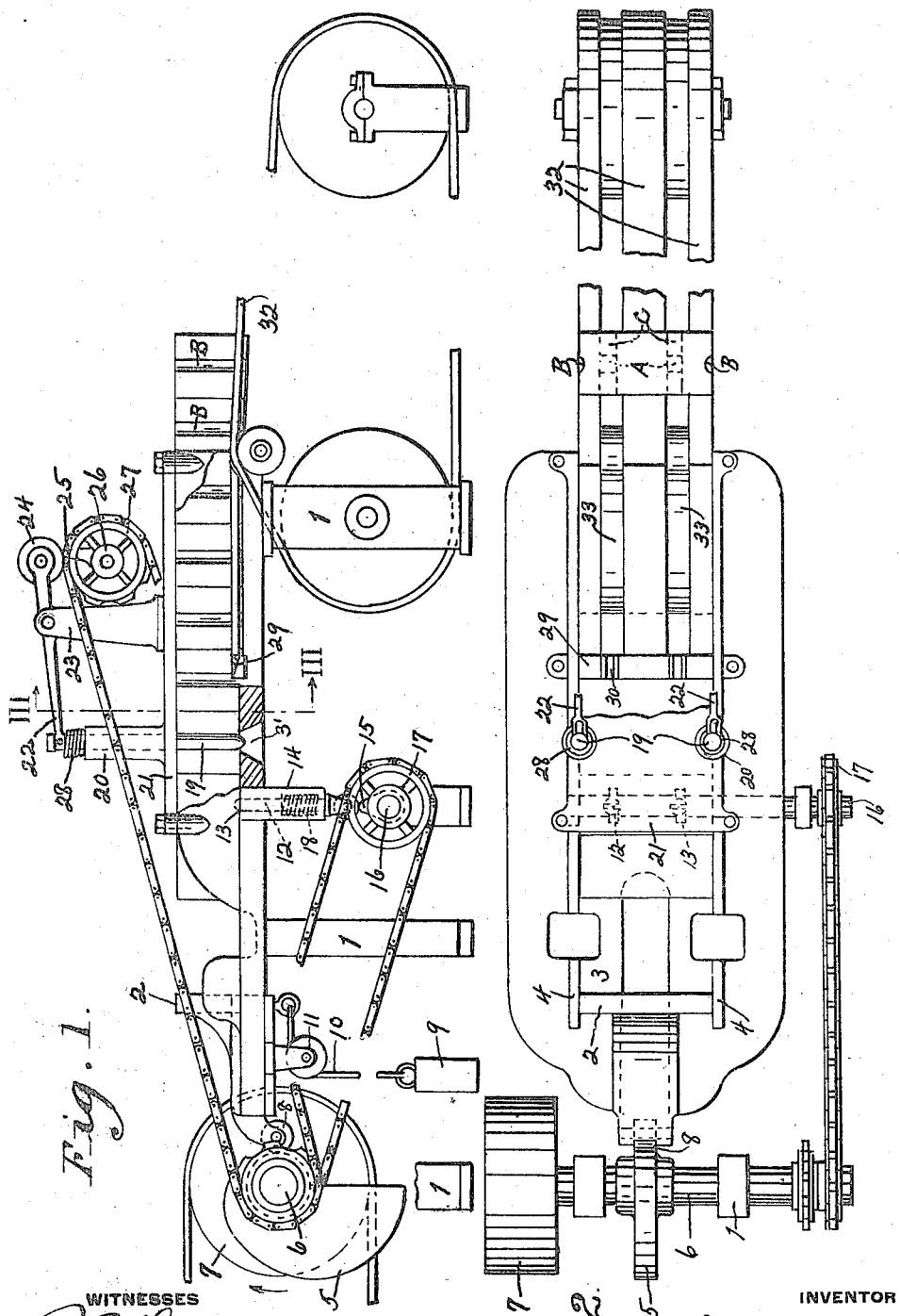
WITNESSES
R. F. Dilworth
W. A. Thompson
INVENTOR
Joseph B. Nicholson
By H. W. Stevenson
Attorney

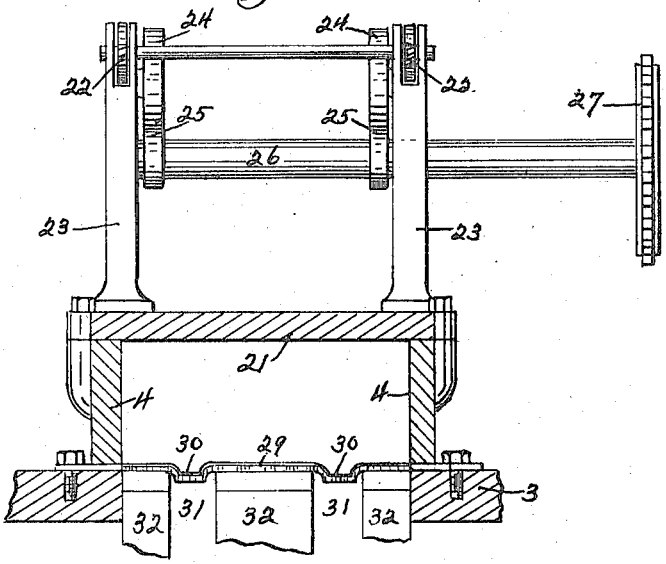
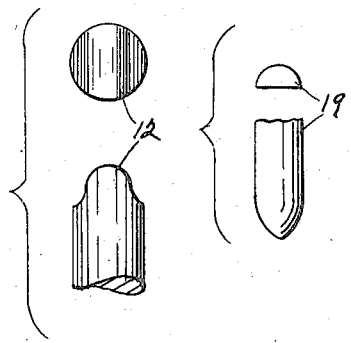
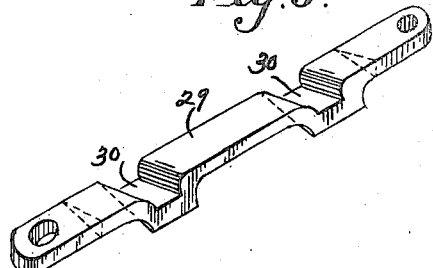
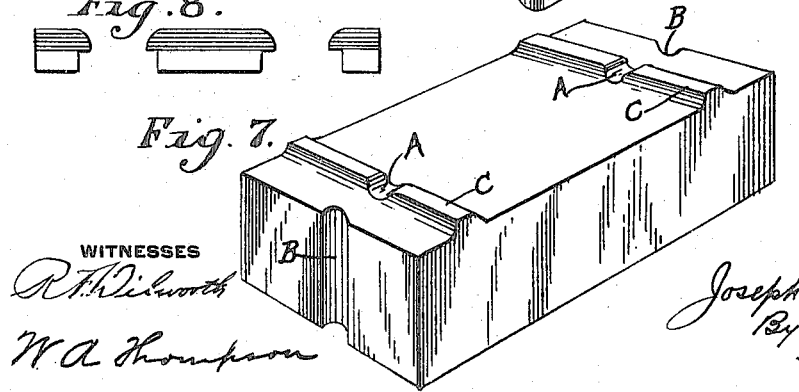

UNITED STATES PATENT OFFICE.

JOSEPH B. NICHOLSON, OF STEUBENVILLE, OHIO.

MACHINE FOR MANUFACTURING RIBBED PAVING-BLOCKS.

1,148,529.  Specification of Letters Patent.  Patented Aug. 3, 1915.

Application filed June 25, 1914. Serial No. 847,304.

*To all whom it may concern:*

Be it known that I, JOSEPH B. NICHOLSON, a citizen of the United States, residing at Steubenville, in the county of Jefferson and State of Ohio, have invented a certain new and useful Improvement in Machines for Manufacturing Ribbed Paving-Blocks, of which the following is a specification.

This invention pertains to the art of brick or block manufacture where the material utilized is of a more or less plastic nature during the forming process, the fundamental idea being the production of bricks or blocks adaptable for paving purposes, whereby said bricks or blocks will be provided with spacing lugs or ribs together with suitably positioned grooves or notches in order to provide a bonding means for the cement or mortar.

The primary object of my invention resides in a power driven machine or mechanism involving a stationary cutting member or knife, which is of a special design for the purpose intended and removes a predetermined amount of material from the block, leaving integral ribs thereon, together with means for providing adequately positioned grooves and notches in said block, said latter mentioned portions to be formed either prior or subsequent to the action of the knife.

The accompanying drawings illustrate one practical embodiment of my invention, which however is subject to modifications without departing from the original idea and intention. I therefore do not limit myself to the exact construction shown and described hereinafter, but reserve the right to make any necessary alterations that will be within the scope of the appended claims.

Referring then to said drawings, Figure 1 is a longitudinal elevation of the machine, showing a series of paving blocks in process of formation; Fig. 2 is a plan view of the same, only one completed block being shown; Fig. 3 is a transverse section taken on the line 111—111 of Fig. 1; Fig. 4 shows two views of a notching tool, and Fig. 5 likewise shows two views of still another tool utilized for forming end grooves in the block; Fig. 6 is a perspective view of the cutting knife; Fig. 7 is a similar view of the completed block as turned out by the machine, and Fig. 8 shows a modified means for forming the said cutting knife into a plurality of separated units.

Throughout the several views the supporting structure, which can be of any adequate design and size, is indicated by the reference numeral 1.

At the admission or feed end of the machine is arranged a reciprocally actuated slide member or plunger 2, which operates on a table portion 3 between guide plates 4. The forward movement of said plunger is brought about by the action of a specially designed cam 5, which is adequately mounted for rotation on a power driven shaft 6 mounted on which is an ordinary belt pulley 7. Said plunger, at its rear portion, is provided with a suitably arranged idler 8, which member receives the direct thrust of said cam 5 to operate the plunger in its advanced movement. The reverse, or backward movement of said plunger is automatically caused by a suitably arranged counter weight 9, a cable 10 being secured to said weight, passing over a stationary sheave 11, and connected to said plunger at any convenient position, preferably at its forward portion as shown.

The first operation performed on the block, after it has been pushed forward by the action of the said plunger, is the formation of two or more spaced-apart and alining indentations or notches A in the under side of the block and on a longitudinal center line thereof, which function is accomplished by means of the tools 12, one of which is shown in Fig. 4. These said tools operate through apertures 13 arranged in the table portion, and are suitably housed in journals 14 depending below the floor line. The upward thrust of these said tools 12 is brought about by a cam 15 mounted on a shaft 16, which is driven by a sprocket or other suitable wheel 17 connected by a chain or belt with the main drive shaft 6. A reverse or return movement of these members 12 is accomplished by an expansion spring 18, or other substitute means.

The next succeeding step in the operation consists in forming the grooves or channels B in the end portions of the block and on a vertical center line thereof, this second function being accomplished by the following described mechanism: Arranged at diametrically opposite points in the side walls 4, a predetermined distance in advance of the notching members 12, are the vertically actuated grooving tools 19, one of the same being shown in Fig. 5, operatable through suitable housings 20 carried by the roof plate 21. Downward movement of these said grooving tools is caused by the oscillatory lever arms 22 which are pivotally supported by standards 23, one end being connected to the said grooving tool 19 and the other end carrying an idler 24. The simultaneous movement of both levers to depress the tools 19, when performing their intended function of forming the end grooves B, is accomplished by cams 25 mounted on a shaft 26, which is driven by a sprocket or other substitute wheel 27 connected by a chain or belt with the main drive shaft 6. During this downward movement of the tools 19 the springs 28 are depressed and the instant the cam pressure on the idlers 24 ceases said springs expand and raise the said tools a sufficient distance for clearance as the next succeeding block is shoved into operative position.

The last step in the process is forming the transverse lugs or ribs C on the under face of the blocks. A knife 29 involving spaced-apart depressions 30 is removably secured in position on the table 3 over an opening, and in advance of the grooving tools. This said knife, a detail construction of which is shown in Figs. 3 and 6, involves three cutting edges separated from each other by the channels or depressions 30. Said knife is so arranged that the three cutting edges will be in accurate horizontal alinement and elevated a predetermined distance above the plane of the table, while said depressions 30 will project downward through suitable openings or parallel spaces 31.

As the blocks are advanced after receiving the end grooves B the under face is subjected to the cutting action of said knife 29, resulting in the formation of the transverse ribs C, whose height is determined by the distance said cutting edge is elevated above the table, and the width by the size of the grooves 30.

In Fig. 8 I have shown a modified form of knife divided into three spaced-apart and separated units, which is intended as a substitute for the integral form of knife 19.

At each forward movement of the plunger the finished blocks are gradually advanced onto a hacking belt 32, which is moved at a speed in excess of the drive shaft 6, from which belt the blocks are lifted and placed in cars which convey them to the drying kiln, not shown. During this final operation the newly formed ribs ride in parallel grooves or spaces 33, which removes the possibility of said ribs wearing or of being subjected to any frictional contact during the blocks' passage out of the machine. The conveyer belt 32 can likewise be made in three parallel sections to provide spaces for the said ribs during the blocks' travel thereon.

The operation of my device is as follows: The main shaft 6 is driven in a direction indicated by arrow at approximately thirty revolutions per minute, or faster by belting from counter shaft. A previously cut block 70 is then placed between the side walls 4, suitable spaces or finger recesses being provided at each side for convenience when placing the blocks. The plunger 2 is forced forward at a predetermined rate of speed by the action of the cam 5 a distance of approximately two inches, when the speed is reduced, by reason of the construction of the cam, in order to prevent any fracture of the block when the plunger meets it. After the plunger and block are in close contact one with the other, said plunger again moves forward at an accelerated speed, owing to the shape of said cam, this time its finishing stroke being approximately four inches or a total of six inches. The plunger is then automatically returned to its limit of backward movement by means of the counter weight 9, the cam by this time having completed its stroke, the plunger then resting until said cam has completed a partial revolution of approximately ninety degrees, which gives the operator sufficient time to place another block in the path of the plunger.

During this period, while the plunger is at rest, the first block, on its under surface which contacts with the table 3, is subjected to the action of a pair of notching or puncturing tools 12, said tools being raised simultaneously by the action of the cams 15. Alining notches or indentations of suitable size and depth are thus made on a longitudinal center line of each block presented in sequence, said notches being approximately one-fourth distant from each end and on the under side.

Another block is then placed in the machine, its movement being identical with the operation heretofore described, which results in the first block being moved up to the end grooving cutters 19, and at a position that will bring said cutters on a vertical center line with the block. The cams 26 now operate to raise the end of the lever 22 contiguous to said cams, thereby depressing the opposite end and causing a downward movement of the cutters 19. Vertical grooves of predetermined shape and area are in this manner formed in the ends of each block presented in sequence, the excess material falling through an aperture 3'. While this foregoing described function is taking place the second block is being subjected to the action of the notching tools 12, thus both the bottom puncturing and end grooving steps are accomplished simultaneously and while the plunger and blocks are at rest.

The next succeeding and final step in the complete formation of the block is accomplished as follows: Still another block is now placed in contact with the second block and subjected to the forward pushing action of the plunger. This carries the first block which has already been subjected to the two previously described actions, half way over the stationary cutting knife 29, and during said advanced movement the knife cuts away a middle and two end portions from the under side of the block, stopping when it has reached the longitudinal center line or the previously formed notches A, the excess material falling through an opening in the table. A fourth block is now placed in the machine and by the forward movement of the plunger the remaining half of said partially completed first block is cut away by the knife, and likewise one-half of the next succeeding or second block.

The finished block shown in Fig. 7 is thus formed in the manner heretofore described, involving the transverse spacing lugs C, notches A and grooves B, or if desired the said notching and grooving portions of the mechanism can be disconnected and the block be formed with the spacing ribs.

I do not claim any particular novelty in the said belt conveyer, but confine my invention to the three successive operations essential to the forming of said notches, end grooves, and spacing ribs, taken in conjunction with the mechanism employed for accomplishing these results.

What I claim as my invention is:

1. A machine for forming spacing ribs on unburned paving blocks, involving a suitable structure having a table portion, a stationary knife secured to the table its cutting edge extending above the plane of said table, and means, involving a reciprocating plunger mounted on the table and held against lateral or vertical displacement, its advanced movement terminating a predetermined distance from the knife, for presenting the blocks to the cutting action of said knife.

2. In a machine for forming spacing lugs on unburned paving blocks, involving a suitable structure having a table portion, a knife secured to the table, said knife comprising spaced-apart cutting edges which extend above the plane of said table, a reciprocating member slidably arranged on the table for advancing the blocks over the knife, its forward movement terminating a predetermined distance from said knife, and means for forming grooves in the end portions of the blocks.

3. In a device of the character described, a suitable supporting structure having a table portion, a knife secured to said table, said knife involving spaced-apart cutting edges which extend above the plane of said table, a reciprocally actuated member slidably arranged on the table for advancing the material over said knife, means for forming spaced-apart indentions in the under face of the material, and additional means for forming vertical grooves in the end portions of the material.

4. In a device of the character described, a suitable supporting structure having a table portion, a knife secured to said table, said knife involving spaced-apart cutting edges which extend above the plane of said table, a reciprocally actuated member slidably arranged on the table for advancing the material over said knife, and means entering through the table for forming spaced-apart indentations in the under face of the material.

5. In a device of the character described, a suitable supporting structure having a table portion; a slide member arranged for reciprocal movement on said table; a cam for moving the slide in one direction to advance the material being worked on; automatic means for returning said slide to its normal attitude; cam operated members entering through the said table for forming spaced-apart indentations in the under surface of the material; additional cam operated members for forming grooves in the end portions of the material; and a knife secured to the table for forming integral ribs on the material, said knife comprising spaced-apart cutting edges which extend above the plane of said table.

In testimony whereof I affix my signature in the presence of two witnesses.

JOSEPH B. NICHOLSON.

Witnesses:
 M. S. THOMPSON,
 H. W. STEVENSON.